(12) United States Patent
Bridson (10) Patent No.: US 7,149,662 B2
(45) Date of Patent: Dec. 12, 2006

(54) AUTOMATED SELECTION OF OPTICAL SYSTEMS

(75) Inventor: William Douglas Bridson, Ontario, NY (US)

(73) Assignee: Navitar, Inc., Rochester, NY (US)

( * ) Notice: Subject to any disclaimer, the term of this patent is extended or adjusted under 35 U.S.C. 154(b) by 217 days.

(21) Appl. No.: 10/961,517

(22) Filed: Oct. 7, 2004

(65) Prior Publication Data

US 2006/0082911 A1 Apr. 20, 2006

(51) Int. Cl.
*G06F 17/50* (2006.01)

(52) U.S. Cl. ............ 703/1; 705/26; 348/207.1; 359/896

(58) Field of Classification Search ........ 703/1
See application file for complete search history.

(56) References Cited

U.S. PATENT DOCUMENTS

| | | | |
|---|---|---|---|
| 5,067,067 A | 11/1991 | Estelle et al. | |
| 5,339,252 A | 8/1994 | White et al. | |
| 5,504,687 A | 4/1996 | Wolf | |
| 5,555,406 A | 9/1996 | Nozawa | |
| 5,745,765 A | 4/1998 | Paseman | |
| 5,943,245 A | 8/1999 | Melfi et al. | |
| 5,971,537 A | 10/1999 | Fukuma et al. | |
| 5,978,766 A | 11/1999 | Luciw | |
| 6,173,210 B1 | 1/2001 | Bjornson et al. | |
| 6,260,046 B1 | 7/2001 | Lukaszewski et al. | |
| 6,370,513 B1 | 4/2002 | Kolawa et al. | |
| 6,736,506 B1 | 5/2004 | Izumitani et al. | |
| 6,746,120 B1 | 6/2004 | Broderick et al. | |
| 6,781,682 B1 | 8/2004 | Kasai et al. | |
| 6,782,301 B1 | 8/2004 | Maruyama | |
| 6,815,659 B1 | 11/2004 | Cartlidge | |
| 6,895,334 B1 | 5/2005 | Yabe | |
| 6,903,323 B1 | 6/2005 | Cartlidge et al. | |
| 6,937,997 B1* | 8/2005 | Parulski ............. | 705/26 |
| 6,970,754 B1 | 11/2005 | Nanbu et al. | |
| 2002/0103714 A1 | 8/2002 | Eze | |
| 2002/0161664 A1* | 10/2002 | Shaya et al. ........ | 705/26 |
| 2002/0161776 A1 | 10/2002 | Lanfredi et al. | |
| 2003/0208399 A1 | 11/2003 | Basak et al. | |

(Continued)

FOREIGN PATENT DOCUMENTS

JP    2000122011    4/2000

(Continued)

OTHER PUBLICATIONS

Computer Optics, Inc www.computeroptics.com, 1999-2002.*

(Continued)

*Primary Examiner*—Zoila Cabrera
*Assistant Examiner*—Mary C. Jacob
(74) *Attorney, Agent, or Firm*—Martin Fleit; Paul D. Bianco; Fleit Kain Gibbons Gutman Bongini & Bianco, P.L.

(57) ABSTRACT

An automated system for selecting optical apparatus compares a set of user specifications with the optical characteristics of a plurality of standard optical components, and automatically chooses a combination of the components forming the closest match to the user's requirements. The method is performed using a programmed computer which may be remotely interfaced with the user via the internet. The user inputs the specification into the computer using a standardized input table. The user may optionally specify that the system be designed using a particular product line or family of standard products. If a system exactly matching the customer's specifications cannot be found, two systems are suggested that bracket the customer's stated requirements.

4 Claims, 5 Drawing Sheets

U.S. PATENT DOCUMENTS

| | | |
|---|---|---|
| 2004/0059626 A1* | 3/2004 | Smallwood .................. 705/10 |
| 2004/0060014 A1 | 3/2004 | Khalil |
| 2004/0095623 A1 | 5/2004 | Barresi et al. |
| 2004/0133604 A1 | 7/2004 | Lordo |
| 2004/0153332 A1 | 8/2004 | Libuit et al. |
| 2004/0204909 A1 | 10/2004 | Abitan et al. |
| 2004/0243483 A1 | 12/2004 | Baumann et al. |
| 2005/0004693 A1 | 1/2005 | Bahel et al. |
| 2005/0073648 A1 | 4/2005 | Toshima et al. |
| 2005/0095008 A1 | 5/2005 | DeCusatis et al. |
| 2005/0097373 A1 | 5/2005 | Stoupis et al. |
| 2005/0122472 A1 | 6/2005 | Fisher et al. |
| 2005/0128302 A1 | 6/2005 | Parulski |
| 2005/0168032 A1 | 8/2005 | Olarte |

FOREIGN PATENT DOCUMENTS

| | | |
|---|---|---|
| JP | 2001350982 | 12/2001 |
| WO | WO0227601 | 4/2002 |

OTHER PUBLICATIONS

Tarabanis et al "A Survey of Sensor Planning in Computer Vision", IEEE Transactions of Robotics and Automation, vol. 11, No. 1, Feb. 1995.*

Image Labs International, www.imagelabs.com, Sep. 24, 2004, obtained via the Wayback Machine.*

Fales, "Ten Lens Specifications You Must Know For Machine-Vision Optics", Test & Measurement World, Oct. 27, 2003.*

Titus, "Vision Education: It's Almost Free", Test & Measurement World, Nov. 1, 2003.*

* cited by examiner

FIG. 1

|   | A | B |
|---|---|---|
| 1 | CUSTOMER INPUT SPECIFICATIONS | Input Data |
| 2 |   |   |
| 3 | (All Dimensions In MM) |   |
| 4 |   |   |
| 5 | ITEM - BASIC |   |
| 6 |   |   |
| 7 | VERTICAL SENSOR SIZE OR LINE LENGTH (OPTIONAL) | 25.4 |
| 8 |   |   |
| 9 | CAMERA FORMAT OR LINE SCAN LENGTH | 50.8 |
| 10 |   |   |
| 11 | PIXEL SIZE (OPTIONAL) | 0.5 |
| 12 |   |   |
| 13 | NUMBER OF VERTICAL PIXELS, OR LINEAR PIXELS | 45 |
| 14 |   |   |
| 15 | LARGEST DIMENSION OF OBJECT TO BE VIEWED | 250 |
| 16 |   |   |
| 17 | SMALLEST DIMENSION OF OBJECT TO BE RESOLVED (OPTIONAL) | 30 |
| 18 |   |   |
| 19 | DESIRED WORKING DISTANCE | 914 |
| 20 |   |   |
| 21 | CAMERA MOUNTING CONFIGURATION | C-MOUNT |
| 22 |   |   |
| 23 |   |   |
| 24 |   |   |
| 25 | ITEM - ACCESSORY (CHECK BOXES) |   |
| 26 |   |   |
| 27 |   |   |
| 28 |   |   |
| 29 | COAXIAL ILLUMINATION ? | yes |
| 30 |   |   |
| 31 | EXTERNAL ILLUMINATION, RING LIGHT OR UNI-LITE ? | no |
| 32 |   |   |
| 33 | INTERNAL FOCUSING ? | yes |
| 34 |   |   |
| 35 | POLARIZATION ? | yes |
| 36 |   |   |
| 37 | APERTURE CONTROL ? | yes |
| 38 |   |   |
| 39 | DETENTED ZOOM ? | no |
| 40 |   |   |
| 41 | MOTORIZATION ? | no |
| 42 |   |   |
| 43 | AUTO FOCUS ? | yes |
| 44 |   |   |
| 45 |   |   |
| 46 |   |   |
| 47 | SPECIFIC PRODUCT LINE (OPTIONAL) |   |
| 48 | CCTV LENSES | no |
| 49 | DYOTAR LENSES | no |
| 50 | PRECISE EYE | yes |
| 51 | ZOOM 6000 | no |
| 52 | 12X ZOOM SYSTEM | no |
| 53 | ZOOM 7000 | no |
| 54 | LARGE FORMAT LENSES | no |
| 55 | EASY READER AUTO-FOCUS ZOOM SYSTEM | no |

*FIG. 2*

|  | A | B | C | D | E | F | G |
|---|---|---|---|---|---|---|---|
|  |  |  |  | OPTICAL CHARACTERISTICS | | | |
|  | EQUIPMENT CHARACTERISTIC | CCTV | DYOTAR | PE | 6.5X | 12X | 7000 |
|  | LARGEST IMAGE FORMAT | 1/3" - 1" | 30 | 2/3" | 2/3" | 1/2" | 2/3" |
|  | CAMERA MOUNTING | C | C | C, ENG | C, ENG | C, ENG | C, ENG |
|  | MAG - MACRO | 0.05 - 1X | 0.05 - 1X | 0.3 - 7.2X | 0.09 - 45X | 0.1 - 28X | 0.02 - 0.22X |
|  | MAG - MICRO | N/A | N/A | 3 - 91X | 1.7 - 228X | 3.6 - 333X | 0.07X - 1.1X |
|  | WD - MACRO | 1100 - 25 | 1800 - 40 | 356 - 36 | 356 - 36 | 341 - 32 | 1219 - 610 |
|  | WD - MICRO | N/A | N/A | 34 - 13 | 34 - 13 | 34 - 13 | 305 - 130 |
|  | COAX? | NO | NO | YES | YES | YES | NO |
|  | EXTERNAL ILL.? | NO | NO | YES | YES | YES | NO |
|  | DETENTS? | N/A | N/A | N/A | YES | YES | NO |
|  | MOTORIZATION? | NO | NO | YES | YES | YES | NO |
|  | RESOLVE LIMIT - MACRO | 5MIC | 50MIC | 2.4MIC | 2.4MIC | 1.6MIC | 40MIC |
|  | RESOLVE LIMIT - MICRO | N/A | N/A | 0.6MIC | 0.6MIC | 0.6MIC | 10MIC |
|  | LIGHT GATHERING | GOOD | FAIR | POOR | POOR | POOR | GOOD |
|  | INTERNAL FOCUS? | YES | NO | YES | YES | YES | YES |
|  | POLARIZATION? | NO | NO | NO | YES | YES | NO |
|  | APERTURE DIA? | YES | YES | YES | YES | YES | YES |
|  | CAM TO OBJECT LENGTH | 1235-65 | 1800-200 | 522-162 | 736-232 | 704-265 | 1413-334 |
|  | EXTERNAL MOUNTING? | NO | NO | YES | YES | YES | NO |
|  | PARFOCAL ZOOM? | N/A | N/A | N/A | YES | YES | YES |
|  | N.A. MACRO | 0.003-0.055 | 0.005-0.055 | 0.018-0.141 | 0.006-0.14 | 0.005-0.20 | 0.003-0.007 |
|  | N.A. MICRO | N/A | N/A | 0.14-0.55 | 0.06-0.55 | 0.05-0.55 | 0.006 - 0.031 |
|  | DEPTH OF FIELD MACRO | 56-0.165 | 20-.165 | 3.2-0.05 | 14.5-0.03 | 20-0.10 | 55-10.2 |
|  | DEPTH OF FIELD MICRO | N/A | N/A | .03-.002 | 0.14-.002 | 0.31-.002 | 3.5 - 0.5 |
|  | AUTO - FOCUS | NO | NO | NO | NO | NO | NO |

FIG. 3A

| | H | I | J | K | L | M | N | O | P | Q |
|---|---|---|---|---|---|---|---|---|---|---|
| 1 | | | | | | | | | | |
| 2 | | | | | | OPTICAL CHARACTERISTICS | | | | |
| 3 | | | | | | | | | | |
| 4 | | | LARGE FORMAT | | | | | | EASY READER | |
| 5 | 25/8 PLAT | 50/1.0 FLD PLAT | 50/1.0 FLD PLAT | 17/4.0 RAPT | 24/2.8 rapt | 28/2.8 RAPT | 50/1.4 RAPT | 50/1.8 RAPT | STANDARD | HM |
| 6 | 42 | 16 | 22 | 20 | 40 | 40 | 50 | 40 | 1/6" | 1/6" |
| 7 | | | | | | | | | | |
| 8 | C,F | C | ? | F | F | F | F | F | N/A | N/A |
| 9 | | | | | | | | | | |
| 10 | | | | | | | | | | |
| 11 | 0.1-0.5X | .071-.143 | 0.05-0.1 | <0.07 | <0.11 | <0.09 | <0.11 | <0.11 | 0.013-1.4 | 0.07-2.7 |
| 12 | N/A | N/A | N/A | N/A | N/A | N/A | N/A | N/A | N/A | 0.6-8.9 |
| 13 | | | | | | | | | | |
| 14 | | | | | | | | | | |
| 15 | 245-45 | 660-318 | 1000-500 | >250 | >250 | >300 | >450 | >450 | 309-37 | 356-36 |
| 16 | N/A | N/A | N/A | N/A | N/A | N/A | N/A | N/A | N/A | 33 |
| 17 | | | | | | | | | | |
| 18 | | | | | | | | | | |
| 19 | | | | | | | | | | |
| 20 | NO | NO | NO | NO | NO | NO | NO | NO | YES | YES |
| 21 | NO | NO | NO | NO | NO | NO | NO | NO | YES | YES |
| 22 | N/A | N/A | N/A | N/A | N/A | N/A | N/A | N/A | NO | NO |
| 23 | NO | NO | NO | NO | NO | NO | NO | NO | YES | YES |
| 24 | | | | | | | | | | |
| 25 | 55-16MIC | 10-5.3MIC | 14.5-7.5MIC | 40.7MIC | 18.7MIC | 22.6MIC | 9.4MIC | 12.1MIC | 6MIC | 4MIC |
| 26 | N/A | N/A | N/A | N/A | N/A | N/A | N/A | N/A | N/A | 3MIC |
| 27 | | | | | | | | | | |
| 28 | | | | | | | | | | |
| 29 | POOR | GOOD | GOOD | FAIR | GOOD | GOOD | GOOD | GOOD | GOOD | GOOD |
| 30 | YES | YES | YES | YES | YES | YES | YES | YES | AUTO | AUTO |
| 31 | NO | NO | NO | NO | NO | NO | NO | NO | YES | YES |
| 32 | YES | YES | YES | YES | YES | YES | YES | YES | YES | YES |
| 33 | 317-129 | 770-330 | 1200-700 | >370 | >370 | >420 | >570 | >570 | 200-550 | 200-550 |
| 34 | NO | NO | NO | NO | NO | NO | NO | NO | YES | YES |
| 35 | N/A | N/A | N/A | N/A | N/A | N/A | N/A | N/A | YES | YES |
| 36 | | | | | | | | | | |
| 37 | 0.006-0.021 | .033-.063 | .023-.044 | <.008 | <.018 | <.015 | <.035 | <.028 | <.056 | 0.0033-0.09 |
| 38 | N/A | N/A | N/A | N/A | N/A | N/A | N/A | N/A | N/A | 0.019-0.13 |
| 39 | | | | | | | | | | |
| 40 | 13.9-1.1 | 0.46-0.13 | 0.95-0.26 | >7.81 | >1.57 | >2.22 | >0.41 | >0.64 | >0.16 | >0.08 |
| 41 | N/A | N/A | N/A | N/A | N/A | N/A | N/A | N/A | N/A | >0.03 |
| 42 | | | | | | | | | | |
| 43 | NO | NO | NO | NO | NO | NO | NO | NO | YES | YES |

AUTOMATED SELECTION OF OPTICAL SYSTEMS

BACKGROUND OF THE INVENTION

1. Field of the Invention

The present invention broadly relates to optical systems, and deals more particularly with the automated selection of optical systems using standardized optical components.

2. Prior Art

A variety of optical systems are commonly used to perform inspection or monitoring processes in industrial applications. In some cases, human operators use the optical systems to view objects, surface features or other phenomenon of interest. In other cases, optical systems are used as part of "machine vision" systems to automatically perform inspection or recognition processes. Machine vision systems typically include a camera or similar recording device which includes an optical lens for imaging an object onto a sensor comprising either a linear or two dimensional array of pixels that electronically record an image of the object and convert it to a digitized pixel stream that is processed by a machine vision processor. The processor typically forms part of a programmed computer that operates on the digitized pixel stream to determine whether certain characteristics are present in the image, and displays the recorded image or feature of interest on a monitor.

Optical systems of the type mentioned above are often designed using a number of relatively standard, off-the-shelf components, such as specialized lens systems, illumination sources, focusing mechanisms and camera mounts. A variety of lenses may be employed, depending upon the application, such as micro lenses, macro lenses, zoom lenses, and other lens combinations which are well known in the art.

In designing optical lens systems for machine vision and other applications, a variety of well known formulas and guidelines have been developed to aid in selecting an optical system for specific industrial applications. For example, it is known that as the numerical aperture increases, the depth of field decreases and resolution increases. As magnification increases, the field of view decreases and more light may therefore be needed. Further, for example, it is well known that magnification is developed in two ways—either by using different lenses and different magnifications at the camera, or by using camera and monitor combinations that develop magnification between themselves. Similar rules and guidelines have been developed relating to depth of field, depth of focus, distortion, resolution, object-to-image distance, working distance, etc.

In the past, in order to specify an optical system for a specific application, such as a machine vision inspection application, an optical system engineer would manually review the requirements for the application and then select a combination of standardized optical components that function in combination to meet the application requirements. While this prior "manual" approach to specifying optical systems generally provided satisfactory results, the process could be time consuming, and required an involvement of an individual with considerable optical background (which defeats the "one stop shopping" concept of using the internet). Moreover, there could be delay in providing a customer or user with the final results of the design process.

Accordingly, there is a need in the art for an automated method of selecting an optical system which overcomes each of the disadvantages of the prior art discussed above.

SUMMARY OF THE INVENTION

According to one aspect of the invention, automated selection of an optical system, comprises the steps of: generating a set of user requirements that include a set of data defining the user's optical imaging specification; generating a second data set defining optical characteristics of each of a plurality of standardized optical devices; generating a set of programmed instructions for comparing the first data set with the second data set; and, using a programmed computer to automatically select a combination of the optical devices that function to essentially satisfy the user's optical imaging specifications. The first data set is generated by recording data defining optical characteristics of a sensor upon which the object will be imaged, recording data defining characteristics of the object, and recording data defining the working distance between the sensor and the object. The sensor characteristics preferably include at least the length of one side of the sensor. The first data set is generated by manually inputting data using a remote user data terminal. In a preferred embodiment the user data is transmitted from the remote user terminal over the internet to a local server site which includes a program computer for analyzing the optical characteristics of a set of standard optical devices and selecting a combination of the optical devices that functionally satisfy the user's requirements.

According to another aspect of the invention, a method for selecting an optical imagining system is provided which employs a programmed computer. The method includes the steps of recording a first set of user data defining a user's specifications for an optical imaging system wherein the first data set includes data relating to the size of the sensor onto which an object is to be imaged, the size of pixels used in the sensor, and the largest dimension of the object to be imaged. The method further includes the steps of determining the optical magnification required by the system to image the object, generating a second set of design data defining optical characteristics of each of a plurality of optical devices, and using a computer, the first and second sets of data and the determined magnification to automatically select a combination of optical devices that function to satisfy the user's specifications within a predetermined tolerance range.

According to still another aspect of the invention, an automated system for selecting optical apparatus, comprises a data input table having fixed data input fields into which a user may input data defining the user's specifications for the optical system, an information storage system for storing the optical characteristics of a plurality of optical devices that may be selected to form the optical system, and a processor for analyzing the user data entered into the input table and for selecting a combination of the optical devices that function to essentially meet the user's specifications.

According, it is a primary object of the invention to provide a method for selecting an optical system which speeds the design process by automating various steps of the process, and eliminates the need for the optical "expert".

Another object of the invention is to provide a method as mentioned above which employs a programmed computer to select optical components to meet a user's optical system requirements.

A further object of the invention is to provide a method for selecting an optical system which eliminates the possibility of guess work or error by using automated selection of optical components.

A still further object of the invention is to provide a method as described above which allows a remote user or customer to select an optical system using an automated design process, and rapidly receive the design results.

Another object of the invention is to provide a method of the type mentioned which essentially eliminates the need for a human designer to assess the user's requirements and manually develop an optical system meeting those requirements.

These, and further objects and advantages of the invention will be made clear or will become apparent during the course of the following description of a preferred embodiment of the invention.

BRIEF DESCRIPTION OF THE DRAWINGS

In the drawings, which form an integral part of the specification, and are to be read in conjunction therewith, and which like reference numerals are employed to designate identical components in the various views:

FIGS. 3A and 3B, taken together, form a table showing the characteristics for each of a plurality of optical components used to select the optical system.

DETAILED DESCRIPTION OF THE PREFERRED EMBODIMENT

Figure 1:
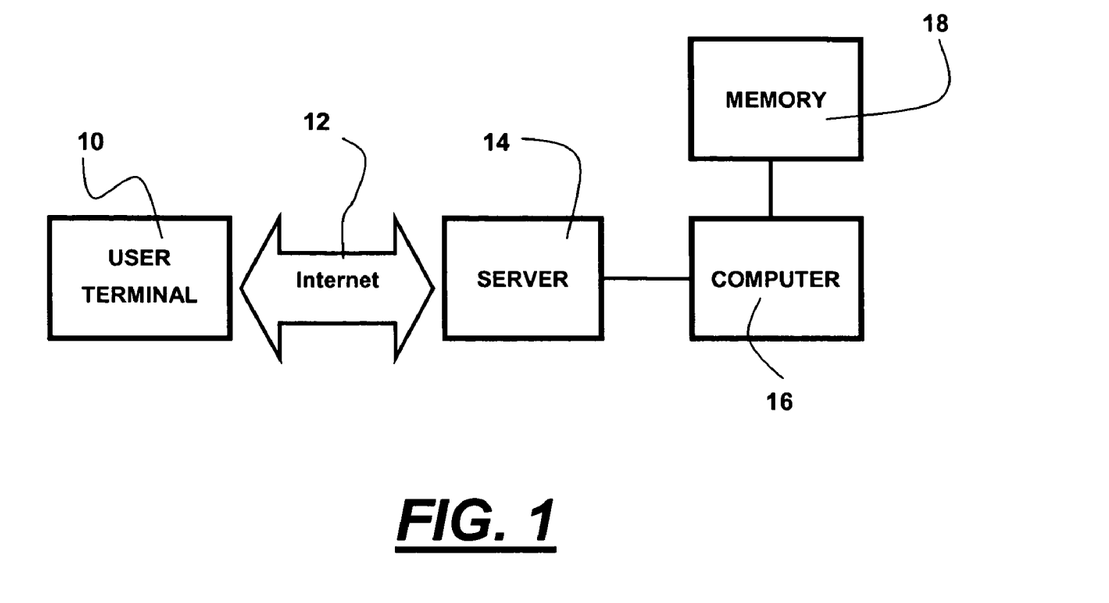
FIG. 1 is a functional block diagram of an automated system for selecting optical apparatus which forms the preferred embodiment of the invention.

Referring first to FIG. 1, the present invention broadly relates to an automated method for selecting an optical system for a user or customer that meet the user's specifications or requirements for a particular application, such as, for example, a machine vision system used to perform an inspection process. In the preferred embodiment, the user is located at a remote user site and inputs the user specifications using a terminal 10 which may comprise a computer or other appliance capable of inputting data and transferring the data through the internet 12 to a server 14 at the user's website location. The user inputs the data into a later discussed data input table (FIG. 2) which has fixed data input fields into which the user input data defining the user's specifications for the optical system.

The server 14 routes the user specified data to a remote site data processor in the form of a computer 16 which is programmed with a set of instructions that are used to carry out the automated optical design process. The computer 16 includes a data storage system which may include one or more suitable memories 18 used to store the programmed instructions, as well as later discussed data defining the optical characteristics of a plurality of standardized optical components such as lenses, illumination sources, camera mounts, and the like. The data input table may also be stored in the memory 18. As will be discussed later, the computer 16 analyzes the user's specifications for the desired optical system and selects a combination of standard optical elements which, in combination, function to meet or substantially meet the customer's requirements. Where the resulting optical system does not exactly meet the customer's requirements, at least two optical systems will be suggested to provide the user with a choice of two systems that essentially bracket the customer's requirements. In other words, two optical systems are suggested that each nearly meet the customers requirements, giving the customer a choice between either of these systems.

From the foregoing, it may be appreciated that the system shown in FIG. 1 is entirely automated after the user inputs his application requirements or specifications. Moreover, because the process is automated, the user is provided with essentially immediate feedback of the system. Further, because the algorithms used by this automated process are preprogrammed, the method will reliably and repeatably design a specific optical system for a given set of input specifications, thus obviating subjective design decision making which may possibly accompany a manual design processes that relies on human beings to make design decisions.

Customer Interface

Generally, the selection process begins with the user or customer initially interfacing with automated system, as generally mentioned above. As the first step in this interface process, the customer inputs data into a customer input form shown in FIG. 1 which will be discussed later in more detail. If the customer wishes to specify a specific product line, the optical designer will automatically select the equipment compatible with the customer's input parameters and display the customer's options. Alternatively, however, the customer may request the automated optical designer to search its entire product line for possible matches. Many customer applications involve imaging a specified object size onto a sensor with a specified working distance. If a zoom system is involved, an attempt is made to cover the object at low magnification and provide a maximum ability to "zoom up" to see finer detail. Usually, the resolving of the fine detail is limited by the ability of the system to overlay the fine detail onto 2 pixels of the sensor (thereby resolving it).

Most sensors are rectangular with varying aspect ratios, or linear arrays of pixels. To eliminate any confusion associated with orientation of object vs. orientation of sensor, the smaller dimension (usually vertical) is used as the framing dimension. If conditions are such that the imaging of the object is marginal, and the customer's sensor is rectangular, the customer is given the option of receiving a small amount of extra coverage by orienting the object horizontally. In some cases, the selected optical components will not exactly match the desired parameters of working distance and field coverage, thus the optical system designer will offer a "bracketing" pair of solutions to choose from.

The normal output of the automated selection system includes the suggested equipment, along with its respective field coverage, working distance, and camera resolve limit at the specified working distance. If a zoom is involved, the working magnification and maximum available magnification and the camera resolve limit at maximum magnification will also be provided.

Figure 2:
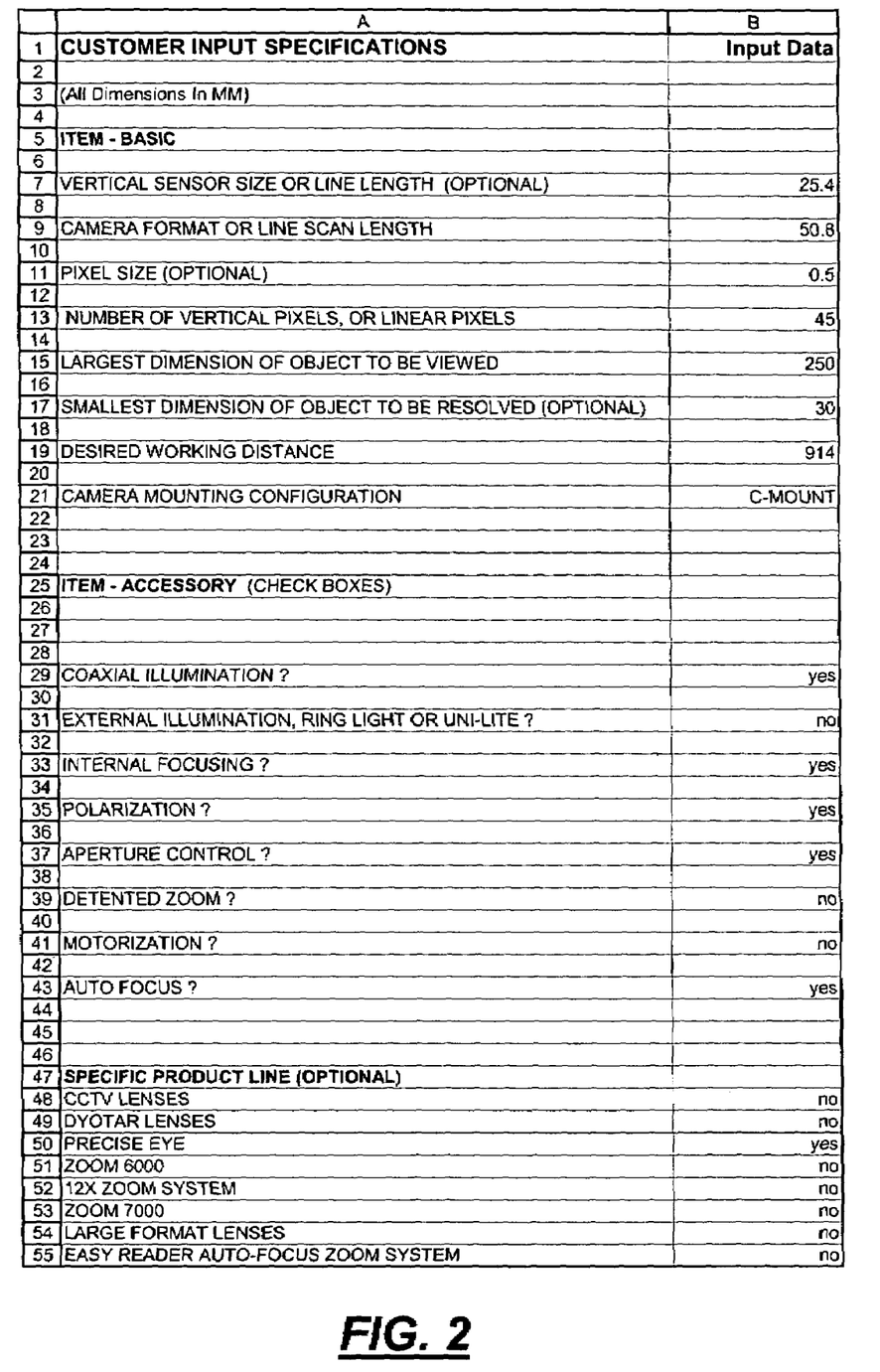
FIG. 2 is a customer input form allowing a customer to input final performance specifications for the optical system.

Reference is now made to FIG. 2 which shows a typical table used by the customer to input his specifications. The customer's input specifications are listed by line number (1–55) in column A, and fall into 3 categories: basic information, accessory information, and specific company product lines. Column B shows an example of data for a typical user application which has been input by the customer for each of the specification categories in column A.

The categories of information or data to be input by the user as shown in FIG. 2 are self-explanatory and well understood by optical designers of ordinary skill in the art, consequently, they need not be discussed in detail herein. Broadly however, the data required to be input on lines 7–21 relate to the characteristics of user's camera or imaging sensor, and those of the object to be imaged by the system. Lines 29–43 relate to possible accessories that are required by the user to meet the requirements of a particular application, such as specific types of illumination, the requirement for polarization, aperture control, motor control or automated focus. Lines 48–55 relates to specific groups or families of products offered by the optical design company. Where the user is familiar with these families of products, he may specify them, in which case the automated design process selects optical components within the specified product family to design the user's optical system Optics Selection Sequence Reference is now also made to FIGS. 3A and 3B which, taken together, form a table showing the optical and equipment characteristics for each of a plurality of optical components that may be selected to "build" an optical system meeting a customer's requirements. The optical components used to build a system are given by name on lines 4 and 5. The characteristics of each of these components are given in column A, and the specific values of the characteristics for each component are given in columns B–Q. It should be noted here that the particular components and characteristic values shown in FIGS. 3A and 3B are merely illustrative of one set of possible components. Many other optical components and characteristics and or values may be used.

The following instruction set is a sequence of operations or instructions in lay terms, for making the selection of the components shown in table of FIGS. 3A and 3B, using the user input information shown in FIG. 2. These instructions may be used as an outline to develop the specific software instructions used to program the computer 16 (FIG. 1) that automatically carries out the selection process.

As used in the following sequenced instructions, "ci" refers to customer input table (FIG. 1), "oc" refers to the optical characteristics table (FIGS. 2A and 2B), and "os" refers to the current optical selection instructions. Brand or generic names of optical components or systems are used merely for illustration.

Begin—$ci7$, use vertical dimension if entered

If $ci7$ is blank, use $ci9$, camera format entering requires lookup table for appropriate vertical dimension If $ci11$ is filled in, use it If $ci11$ is blank, go to $ci13$ and divide the vertical sensor dimension ($os1$) or ($os2$) by the number of vertical pixels to get pixel size Divide the number in $ci15$ into the vertical sensor dimension to get the required magnification If $ci17$ is filled in, calculate the "resolution N.A."=$1/(3000*ci17)$ Check to see that $os4*2<ci17*os5$. If not, report that "resolution requirement is not compatible with total field coverage and camera pixel size. The options are to reduce field coverage, decrease pixel size, or utilize a zoom system".

Scan $ci48$–$ci55$. If any boxes are checked go directly to the appropriate product line column in oc and follow the appropriate instructions in os:

mci48-ocB, ci49-ocC, ci50-ocD, ci51-ocE, ci52-ocF, ci53-ocG, ci54-ocH thru ocN, ci55-ocO thru ocP.

If none of the above boxes are checked it will be necessary to scan all product line columns.

If $ci17$ is filled in, scan $oc51$ and $oc53$ for matches with resolution N.A>($os6$)

Scan $oc7$ for matching camera formats or sensor size ($os1$ or $os2$)

Scan $oc9$ for matching camera mounting

Scan $oc12$ and $oc14$ for matching mag range ($os5$)

Scan $oc17$ and $oc19$ for matching wd range ($ci19$)

Scan $oc22$ To match $ci29$

Scan $oc24$ to match $ci31$

Scan $oc38$ to match $ci33$

Scan $oc40$ to match $ci35$

Scan $oc42$ to match $ci37$

Scan $oc26$ to match $ci39$

Scan $oc28$ to match $ci41$

Scan $oc60$ to match $ci43$

If no columns are a match, provide error message stating mismatch requirements for each column If any columns in oc completely match, proceed to search for specific the equipment that will meet (or bracket) the customer requirements, and provide the customer with information explaining the "tradeoffs" between bracketing conditions.

CCTV Lenses

If ocB is a match, run the cctv calculator to see if there is a pair of lenses that bracket the mag ($os5$) and working distance ($ci19$).

Calculate the camera resolve limit at the object=$2*os4/os5$.

Report the final equipment requirements, field coverage ($ci15$), and bracketing wd's, for each case.

Report the camera resolve limit

Show a representative picture of the equipment (with rough dimensions)

Report the price of the recommended equipment.

Dyotar Lenses

If ocC is a match, run the dyotar calculator for a pair of lenses that bracket the mag ($os5$) and working distance ($ci19$).

Calculate the camera resolve limit at the object=$2*os4/os5$.

Report the final equipment requirements, field coverage, and bracketing wd's, for each case.

Report the resolve limit

Show a representative picture of the equipment (with rough dimensions)

Report the price of the recommended equipment.

PE

If ocD is a match, you will be scanning the PE lookup tables (standard and ultra) for matches or bracketing. There is no special table for the coax version.

Start with the standard lookup table.

Scan lens attachments for a pair that brackets wd ($ci19$)

For each lens attachment, scan adapters for desired mag ($os5$). Select the condition where the listed mag<($os5$).

For each bracketing condition, calculate field coverage=$os2$/listed mag

Calculate the lens resolve limit using the NA of the lens attachment in each bracketing case=$1/(3000*NA)$ Calculate the camera resolve limit in each bracketing case=$2*os4$/listed mag.

Report suggested equipment, wd, field coverage, camera resolve limit, and lens resolve limit in each case.

Go to the ultra lookup table.

Repeat the above steps using objectives instead of lens attachments.

If both standard and ultra equipment can apply, report on both sets of equipment.

Show a representative picture of the equipment (with rough dimensions)

Report the price of the recommended equipment.

Zoom 6000 if ocE is a match, scan the 6.5 lookup tables (standard and ultra) for matches or bracketing. There will be one table for "standard" zoom, one table for "standard zoom with coax", and one table for "ultra-zoom". Do not scan "standard zoom" table if coax (ci29)=yes.

6.5 standard lookup table—

Scan the tables for lens attachments that bracket the wd (ci19).

Scan the adapters columns for matching mag (os5) range. In each case choose the adapter with the "lower mag" range<os5 and with the least difference from os5. Do not use the 5× adapter unless the working mag (os5) is greater than half way thru the next lower adapter's mag range.

Calculate the zoom settings (ZS) to produce os5 in each of the bracketing conditions=os5/(LA mag*ADAPT mag).

Calculate the working N.A. (N.A.W.) for each bracketing condition=[0.026*Ln(ZS)+0.032] [LA mag].

Calculate the working lens resolve limit=1/(3000*N.A.W.) for each bracketing condition.

Calculate the working camera resolve limit=2*os4/os5

Calculate the full mag value=4.5*LA* ADAPT

Calculate the full mag lens resolve limit=1/[3000*0.071*LA]

Calculate the full mag camera resolve=2*os4/full mag

Report, for both bracketing conditions, the equipment selected, wd, working field coverage (ci15), working camera resolve limit, working lens resolve limit, system mag at selected zoom position (os5), highs and lows of available system mag, full mag lens resolve limit and full mag camera resolve limit.

If any of the final equipment includes the 5× Adapter, go to the 12× column (ocF) and scan for suitable equipment. Report this equipment as an alternative with the notation that "Because of excessive empty magnification and light loss, we do not recommend usage of the 5× Adapter if a suitable alternative is available".

Show a representative picture of the equipment (with rough dimensions)

Report the price of the recommended equipment.

6.5 standard lookup table w/coax—this table is similar to the plain standard table referred to above. There are fewer available lens attachments and there is a restriction on adequate illumination at lower system mags. The available mags are also a function of camera format (ci9).

Scan the tables for lens attachments that bracket the wd (ci19).

Scan the adapters columns and applicable camera format rows for matching mag (os5) range. In each case choose the adapter with the "lower mag" range<os5 and with the least difference from os5. Do not use the 5× adapter unless the working mag (os5) is greater than half way thru the next lower adapter's mag range.

Calculate the zoom settings (ZS) to produce os5 in each of the bracketing conditions=os5/(LA mag*ADAPT mag).

Calculate the working *N.A.* (*N.A.W.*) for each bracketing condition=[0.026*Ln(ZS)+0.032] [LA mag].

Calculate the working lens resolve limit=1/(3000*N.A.W.) for each bracketing condition.

Calculate the working camera resolve limit=2*os4/os5

Calculate the full mag value=4.5*LA* ADAPT

Calculate the full mag lens resolve limit=1/[3000*0.071*LA]

Calculate the full mag camera resolve=2*os4/full mag

Report, for both bracketing conditions, the equipment selected, wd, working field coverage (ci15), working camera resolve limit, working lens resolve limit, system mag at selected zoom position (os5), highs and lows of available system mag, full mag lens resolve limit and full mag camera resolve limit.

If any of the final equipment includes the 5× Adapter, go to the 12× column (ocF) and scan for suitable equipment. Report this equipment as an alternative with the notation that "Because of excessive empty magnification and light loss, we do not recommend usage of the 5× Adapter if a suitable alternative is available".

Show a representative picture of the equipment (with rough dimensions)

Report a price for the recommended equipment.

6.5 ultra-zoom lookup table select the objectives that bracket the resolve NA (os6)

calculate the high mag required for the smallest object dimension (ci17) to cover 2 pixels=2*ci11/ci17 in the applicable camera format (ci9) row, select the lowest adapter who's upper mag limit exceeds the high mag requirement If the low mag limit of the adapter selected is larger than os5 use it as the working mag, if smaller, use os5 as the working mag. Calculate the working zoom setting ZSW=2*working mag/(objective mag*adapter mag)

Calculate working NA (NAW) from the following:

NA (6000 ULTRA)

$$W/2\times \text{ mit obj}=0.0251*Ln(ZS)+0.0317 \text{ \& } =0.055 \text{ for } ZS>2.21$$

$$W/5\times \text{ mit obj}=0.0627*Ln(ZS)+0.0791 \text{ \& } =0.14 \text{ for } ZS>2.46$$

$$W/10\times \text{ mit obj}=0.1205*Ln(ZS)+0.1564 \text{ \& } =0.28 \text{ for } ZS>2.7$$

$$W/20\times \text{ mit obj}=0.209*Ln(ZS)+0.3007 \text{ \& } =0.42 \text{ for } ZS>1.72$$

$$W/50\times \text{ mit obj}=0.55$$

Calculate the working field coverage=os2/working mag

Calculate the working lens resolve limit @ NAW, =1/3000*NAW

Calculate the working camera resolve limit=2*os4/working mag calculate the full system mag=(4.5)(objective mag/2) (adapt)

calculate the maximum lens resolve limit=1/(3000*NA) where the NA's are the extremes from the above equations calculate the maximum camera resolve limit=2*os4/full system mag Report, for both bracketing conditions, the equipment selected, wd, working field coverage, working camera resolve limit, working lens resolve limit, working system mag, highs and lows of available system mag, full mag lens resolve limit and full mag camera resolve limit.

Show a representative picture of the equipment (with rough dimensions)

Report a price for the recommended equipment.

12× Zoom System

If ocF is a match, scan the 12× lookup tables (standard and ultra) for matches or bracketing. There will be one table for "standard" zoom, one table for "standard zoom with coax", and one table for "ultra-zoom". Do not scan "standard zoom" table if coax ci29=yes.

Standard 12× Lookup Table scan the tables for lens attachments that bracket the wd (ci19).

In each case choose the adapter with the "lower mag" range<os5 and with the least difference from os5.

Calculate the zoom settings (ZS) to produce os5 in each of the bracketing conditions=os5/(LA mag*ADAPT mag).

Calculate the working N.A. (N.A.W.) for each bracketing condition=[0.000328(ZS)$^3$−0.005274(ZS)$^2$+0.035318(ZS)+0.000965] [LA mag]

Calculate the working lens resolve limit=1/(3000*N.A.W.) for each bracketing condition.

Calculate the working camera resolve limit=2*os4/os5

Calculate the full mag value=7.0*LA* ADAPT

Calculate the full mag lens resolve limit=1/[3000*0.1*LA]

Calculate the full mag camera resolve=2*os4/full mag

Report, for both bracketing conditions, the equipment selected, wd, working field coverage (ci15), working camera resolve limit, working lens resolve limit, system mag at selected zoom position (os5), highs and lows of available system mag, full mag lens resolve limit and full mag camera resolve limit.

Show a representative picture of the equipment (with rough dimensions)

Report a price for the recommended equipment.

12× standard lookup table w/coax—this table is similar to the plain standard table referred to above. There are fewer available lens attachments and there is a restriction on adequate illumination, at lower system mags.

scan the tables for lens attachments that bracket the wd (ci19).

In each case choose the adapter with the "lower mag" range<os5 and with the least difference from os5.

Calculate the zoom settings (ZS) to produce os5 in each of the bracketing conditions=os5/(LA mag*ADAPT mag).

Calculate the working N.A. (N.A.W.) for each bracketing condition=[0.000328(ZS)$^3$−0.005274(ZS)$^2$+0.035318(ZS)+0.000965][LA mag]

Calculate the working lens resolve limit=1/(3000*N.A.W.) for each bracketing condition Calculate the working camera resolve limit=2*os4/os5

Calculate the full mag value=7.0*LA* ADAPT

Calculate the full mag lens resolve limit=1/[3000*0.1*LA]

Calculate the full mag camera resolve=2*os4/full mag

Report, for both bracketing conditions, the equipment selected, wd, working field coverage (ci15), working camera resolve limit, working lens resolve limit, system mag at selected zoom position (os5), highs and lows of available system mag, full mag lens resolve limit and full mag camera resolve limit.

Show a representative picture of the equipment (with rough dimensions)

Report the price of the recommended equipment.

12× ultra-zoom lookup table select the objective based on resolve NA (os6)

calculate the high mag required for the smallest object dimension (ci17) to cover 2 pixels=2*ci11/ci17

In the applicable camera format (ci9) row, select the lowest adapter who's upper mag limit exceeds the high mag requirement If the low mag limit of the adapter selected is larger than os5 use it as the working mag, if smaller, use os5 as the working mag.

Calculate working zoom setting ZSW=[(0.95185*ZS)/2](obj mag) (adapt)

Calculate working NA (NAW) from the following:

NA (12× ULTRA)

$W/2×$ mit obj=0.0271*$Ln(ZS)$+0.0316 & =0.055 for $ZS>2.25$ $W/5×$ mit obj=0.0667*$Ln(ZS)$+0.0786 & =0.14 for $ZS>2.24$ $W/10×$ mit obj=0.1293*$Ln(ZS)$+0.1553 & =0.28 for $ZS>2.25$ $W/20×$ mit obj=0.2222*$Ln(ZS)$+0.2953 & =0.42 for $ZS>1.7$ $W/50×$ mit obj=0.3543*$Ln(ZS)$+0.6062 &=0.55 for $ZS>0.8$ Calculate the working field coverage=os2/working mag Calculate the working lens resolve limit @ NAW, =1/3000*NAW Calculate the working camera resolve limit=2*os4/working mag Calculate the full system mag=(7.0)(objective mag/2)(adapt)

Calculate the maximum lens resolve limit=1/(3000*NA) where the NA's are the extremes from the above equations Calculate the maximum camera resolve limit=2*os4/full system mag Report, for both bracketing conditions, the equipment selected, wd, working field coverage, working camera resolve limit, working lens resolve limit, working system mag, highs and lows of available system mag, full mag lens resolve limit and full mag camera resolve limit.

Show a representative picture of the equipment (with rough dimensions)

Report a price for the recommended equipment.

Zoom 7000

If ocG is a match,

Based on desired wd (ci19), select micro or macro mode.

Calculate the low working mag (lwmag) at (ci19)

Micro, lwmag=(48.332)*(wd$^{-1.153}$)

Macro, lwmag=(53.284)*(wd$^{-1.1362}$)

Calculate the high working mag (hwmag) at (ci19) =6*lwmag

Calculate the field coverage at both low and high mag=os2/wmag

Calculate the camera resolve limit at both low and high mag=2*(os4/wmag)

Calculate the low xwd (lxwd) at the desired mag (os5)

Micro, lxwd=$^{1.153}\sqrt{(48.332/os5)}$

Macro, lxwd=$^{1.1362}\sqrt{(53.284/os5)}$

Check that lxwd falls between 1219–610, or 305–130, if not pick the closest end value in the original selected mode and use it as lxwd.

If the calculated lxwd was not available, recalculate the mag at the revised position Micro, lxmag=(48.332)*(lxwd$^{-1.153}$)

Macro, lxmag=(53.284)*(lxwd$^{-1.362}$)

Calculate the high mag (hxmag)=6*lxmag

Calculate the field coverage at both low and high mag=os2/xmag

Calculate the camera resolve limit at both low and high mag=2*(os4/xmag)

For the desired working distance (ci19), report the field coverage at both low and high mag positions (lwmag) and (hwmag). Also report the camera resolution limits at both low and high mag.

For the desired mag (os5), or the alternate value, report the field coverage at both low and high mag positions (lxmag) and (hxmag). Also report the camera resolution limits at both low and high mag.

Show a representative picture of the equipment (with rough dimensions)
Report the price of the recommended equipment.
Large Format
If ocH–ocO is a match,
ocH:
Determine the working mag (wmag) at the desired wd (ci19)

$$wmag=25/(wd+5)$$

Calculate the field coverage at (ci19)=os2/wmag
Calculate the camera resolve limit at (wmag)=2*(os4/wmag)
Calculate the wd (xwd) at the desired mag (os5)

$$xwd=(25/os5)-5$$

Check that xwd falls between 245–45, if not pick the closest end value and use it as nxwd.
Calculate the new magnification (nxmag) at nxwd=25/(nxwd+5)
Calculate the field coverage at nxwd=os2/nxmag
Calculate the camera resolve limit at (nxmag)=2*(os4/nxmag)
Report the field coverage at the desired working distance (ci19). Report the camera resolve limit at this position.
Report the available wd (xwd) that will have (or come closest to having) the desired field coverage. Report the field coverage at this working distance. Report the camera resolve limit at this position.
Show a representative picture of the equipment (with rough dimensions)
Report a price for the recommended equipment.
ocI:
Determine the working mag (wmag) at the desired wd (ci19)

$$wmag=50/(wd+40)$$

Calculate the field coverage at (ci19)=os2/wmag
Calculate the camera resolve limit at (wmag)=2*(os4/wmag)
Calculate the wd (xwd) at the desired mag (os5)

$$xwd=(50/os5)-40$$

Check that xwd falls between 660–318, if not pick the closest end value and use it as nxwd.
Calculate the new magnification (nxmag) at nxwd=50/(nxwd+40)
Calculate the field coverage at nxwd=os2/nxmag
Calculate the camera resolve limit at (nxmag)=2*(os4/nxmag)
Report the field coverage at the desired working distance (ci19). Report the camera resolve limit at this position.
Report the available wd (xwd) that will have (or come closest to having) the desired field coverage. Report the field coverage at this working distance. Report the camera resolve limit at this position.
Show a representative picture of the equipment (with rough dimensions)
Report a price for the recommended equipment.
ocJ:
Determine the working mag (wmag) at the desired wd (ci19)

$$wmag=50/wd$$

Calculate the field coverage at (ci19)=os2/wmag
Calculate the camera resolve limit at (wmag)=2*(os4/wmag)
Calculate the wd (xwd) at the desired mag (os5)

$$xwd=50/os5$$

Check that xwd falls between 1000–500, if not pick the closest end value and use it as nxwd.
Calculate the new magnification (nxmag) at nxwd=50/nxwd
Calculate the field coverage at nxwd=os2/nxmag
Calculate the camera resolve limit at (nxmag)=2*(os4/nxmag)
Report the field coverage at the desired working distance (ci19). Report the camera resolve limit at this position.
Report the available wd (xwd) that will have (or come closest to having) the desired field coverage. Report the field coverage at this working distance. Report the camera resolve limit at this position.
Show a representative picture of the equipment (with rough dimensions)
Report a price for the recommended equipment.
ocK:
Determine the working mag (wmag) at the desired wd (ci19)

$$wmag=17/(wd+15)$$

Calculate the field coverage at (ci19)=os2/wmag
Calculate the camera resolve limit at (wmag)=2*(os4/wmag)
Calculate the wd (xwd) at the desired mag (os5)

$$xwd=(17/os5)-15$$

Check that xwd>250, if not use 250 as nxwd.
Calculate the new magnification (nxmag) at nxwd=17/(nxwd+15)
Calculate the field coverage at nxwd=os2/nxmag
Calculate the camera resolve limit at (nxmag)=2*(os4/nxmag)
Report the field coverage at the desired working distance (ci19). Report the camera resolve limit at this position.
Report the available wd (xwd) that will have (or come closest to having) the desired field coverage. Report the field coverage at this working distance. Report the camera resolve limit at this position.
Show a representative picture of the equipment (with rough dimensions)
Report a price for the recommended equipment.
ocL:
Determine the working mag (wmag) at the desired wd (ci19)

$$wmag=24/(wd+5)$$

Calculate the field coverage at (ci19)=os2/wmag
Calculate the camera resolve limit at (wmag)=2*(os4/wmag)
Calculate the wd (xwd) at the desired mag (os5)

$$xwd=(24/os5)-5$$

Check that xwd>250, if not use 250 as nxwd.
Calculate the new magnification (nxmag) at nxwd=24/(nxwd+5)
Calculate the field coverage at nxwd=os2/nxmag
Calculate the camera resolve limit at (nxmag)=2*(os4/nxmag)
Report the field coverage at the desired working distance (ci19). Report the camera resolve limit at this position.
Report the available wd (xwd) that will have (or come closest to having) the desired field coverage. Report the field coverage at this working distance. Report the camera resolve limit at this position.

Show a representative picture of the equipment (with rough dimensions)

Report a price for the recommended equipment.

ocM:

Determine the working mag (wmag) at the desired wd (ci19)

$wmag=28/(wd+5)$

Calculate the field coverage at (ci19)=os2/wmag

Calculate the camera resolve limit at (wmag)=2*(os4/wmag)

Calculate the wd (xwd) at the desired mag (os5)

$xwd=(28/os5)-5$

Check that xwd>300, if not use 300 as nxwd.

Calculate the new magnification (nxmag) at nxwd=28/(nxwd+5)

Calculate the field coverage at nxwd=os2/nxmag

Calculate the camera resolve limit at (nxmag)=2*(os4/nxmag)

Report the field coverage at the desired working distance (ci19). Report the camera resolve limit at this position.

Report the available wd (xwd) that will have (or come closest to having) the desired field coverage. Report the field coverage at this working distance. Report the camera resolve limit at this position.

Show a representative picture of the equipment (with rough dimensions)

Report a price for the recommended equipment.

ocN:

Determine the working mag (wmag) at the desired wd (ci19)

$wmag=50/wd$

Calculate the field coverage at (ci19)=os2/wmag

Calculate the camera resolve limit at (wmag)=2*(os4/wmag)

Calculate the wd (xwd) at the desired mag (os5)

$xwd=50/os5$

Check that xwd>450, if not use 450 as nxwd.

Calculate the new magnification (nxmag) at nxwd=50/nxwd

Calculate the field coverage at nxwd=os2/nxmag

Calculate the camera resolve limit at (nxmag)=2*(os4/nxmag)

Report the field coverage at the desired working distance (ci19). Report the camera resolve limit at this position.

Report the available wd (xwd) that will have (or come closest to having) the desired field coverage. Report the field coverage at this working distance. Report the camera resolve limit at this position.

Show a representative picture of the equipment (with rough dimensions)

Report a price for the recommended equipment.

ocO:

Determine the working mag (wmag) at the desired wd (ci19)

$wmag=50/(wd+20)$

Calculate the field coverage at (ci19)=os2/wmag

Calculate the camera resolve limit at (wmag)=2*(os4/wmag)

Calculate the wd (xwd) at the desired mag (os5)

$xwd=(50/os5)-20$

Check that xwd>450, if not use 450 as nxwd.

Calculate the new magnification (nxmag) at nxwd=50/(nxwd+20)

Calculate the field coverage at nxwd=os2/nxmag

Calculate the camera resolve limit at (nxmag)=2*(os4/nxmag)

Report the field coverage at the desired working distance (ci19). Report the camera resolve limit at this position.

Report the available wd (xwd) that will have (or come closest to having) the desired field coverage. Report the field coverage at this working distance. Report the camera resolve limit at this position.

Show a representative picture of the equipment (with rough dimensions)

Report a price for the recommended equipment.

Easy Reader

If ocP-Q is a match:

In this product line, the camera is built in.

Ci7=1.8 mm, therefore os2=1.8

Ci11=0.0023, therefore os4=0.0023

There are two columns, Standard and HM. The difference is in the magnification and resolution requirements.

Scan the Standard and HM lookup tables for compatible wd's and mag ranges. If both are suitable, choose the Standard, unless the resolution requirement ci17 is better matched in HM. Maximum resolution is measured at high zoom position. If ci17 is not achieved in either of the above, use the lowest power objective required to produce the resolution and offer it as an alternative.

Standard

Pick the LA's that bracket the wd requirement ci19

Use os5 as the working mag (wmag)

Calculate the working N.A. (NAW) for each bracketing condition=(0.0414*wmag)−(0.0095*LA)

Calculate the working lens resolve limit=1/(3000*NAW) for each bracketing condition.

Calculate the working camera resolve limit=2*os4/os5

Look up the full mag value (fmag) for each condition

Calculate the full mag camera resolve=2*os4/fmag

Look up the full mag value of lens resolve limit for each condition

Report, for both bracketing conditions, the equipment selected, wd, working field coverage (ci15), working camera resolve limit, working lens resolve limit, system mag at selected zoom position (os5), highs and lows of available system mag, full mag lens resolve limit and full mag camera resolve limit.

Show a representative picture of the equipment (with rough dimensions)

Report a price for the recommended equipment.

HM—Lens Attachment

Pick the LA's that bracket the wd requirement ci19

Use os5 as the working mag (wmag)

Calculate the working N.A. (NAW) for each bracketing condition, based on the individual formulas (per LA) in the lookup table Calculate the working lens resolve limit=1/(3000*NAW) for each bracketing condition.

Calculate the working camera resolve limit=2*os4/os5

Look up the full mag value (fmag) for each condition

Calculate the full mag camera resolve=2*os4/fmag

Look up the full mag value of lens resolve limit for each condition

Report, for both bracketing conditions, the equipment selected, wd, working field coverage (ci15), working camera resolve limit, working lens resolve limit, system mag at selected zoom position (os5), highs and lows of available system mag, full mag lens resolve limit and full mag camera resolve limit.

Show a representative picture of the equipment (with rough dimensions)

Report a price for the recommended equipment.

HM—Objective

If ci17 is not achieved in either of the above, use the lowest power objective required to produce the resolution and offer it as an alternative.

Calculate the working N.A. (NAW) based on the individual formulas (per OBJ) in the lookup table Calculate the working lens resolve limit=1/(3000*NAW)

Calculate the working camera resolve limit=2*os4/os5

Look up the full mag value (fmag)

Calculate the full mag camera resolve=2*os4/fmag

Look up the full mag value of lens resolve limit

Report the equipment selected, wd, working field coverage (ci15), working camera resolve limit, working lens resolve limit, system mag at selected zoom position (os5), highs and lows of available system mag, full mag lens resolve limit and full mag camera resolve limit.

Show a representative picture of the equipment (with rough dimensions)

Report a price for the recommended equipment.

Figure 4:
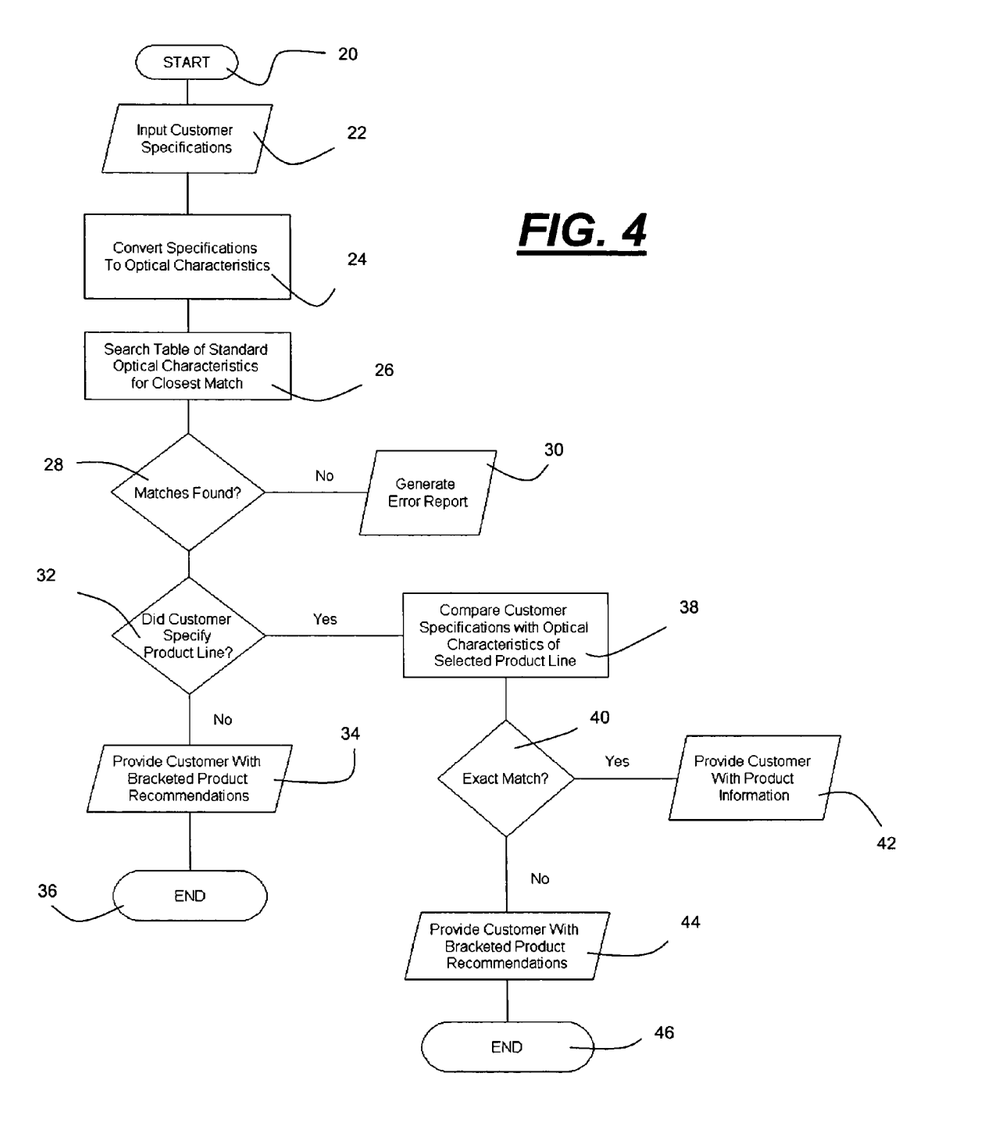
FIG. 4 is a flow chart showing the steps of the automated method used to select the optical system.

Reference is now made to FIG. 4, which shows a simplified flowchart of the basic steps of the automated design method described above. The automated method starts at 20 with the customer establishing contact with the automated design system. In the case of the preferred embodiment described above, this initial contact comprises the customer making contact with the designer's website through the internet, although this communication link could instead be established through a LAN, WAN or direct wireless link. At step 22, the customer inputs data defining the user's requirements or specifications, using the input format shown in FIG. 2. These specifications are converted to optical characteristics by the automated design system at step 24, following which the design system searches a table 26 (FIGS. 3A and 3B) of optical characteristics to determine the closest match between an available optical component and the optical characteristic meeting the customer's specification. If a match is not found at step 28, an error report is generated at step 30, otherwise, the process proceeds to step 32 where a determination is made as to whether the customer has specified a standard product line or family.

If the customer has not specified a particular product line, the customer is provided with two optical design configurations in step 34, which bracket each side of the customer's specifications, thus allowing the customer to choose between these two systems. With the system designs having been provided to the customer, the process ends at 36.

In the event that the customer specifies a product line at step 32, then a comparison is made at step 38, in which the customer's specifications are compared to the optical characteristics of the customer selected product line. If an exact match is found at 40, then the customer in step 42 is provided with full product information on the matching product line. However, if an exact match is not found, the customer is provided with bracketed product line recommendations at 44, following which the process ends at 46.

It is to be understood that the specific systems, methods and techniques which have been described above are merely illustrative of one application of the principles of the invention. Numerous modifications may be made to the system as described without departing from the true spirit and scope of the invention.

What is claimed is:

1. An interactive automated method for designing an optical system for imaging an object, to meet a user's specific imaging need comprising the steps of:
  A. establishing a connection via Internet between a user and a central station that interactively and automatically designs by a computer application an optical system for imaging an object using products of a specific product line in a single session;
  B. sending by the central station, in response to a request by a user, via the Internet connection an input screen to the user for input of the user's specific imaging need for a desired optical system, said screen including blank spaces for user inputs of; (i) basic inputs of camera format or line scan length, number of vertical pixels or linear pixels, largest dimension of object to be viewed, and desired working distance and camera mounting configuration; and (ii) accessory inputs regarding user's desires for coaxial illumination, external illumination, ring light or uni-lite, internal focusing, polarization, aperture control, detented zoom, motorization and autofocus; and a product input for selection of a product from the specific product line; said basic inputs, accessory inputs and product input collectively constituting user's first inputs;
  C. inputting by user the user's first inputs by filling in on the screen the basic inputs, user's desires regarding the accessory inputs and any selection of a product;
  D. sending interactively by the user via the Internet user's first inputs to the central station;
  E. receiving interactively and automatically by the central station via the Internet the user first inputs and automatically converting the received user—s first inputs into a first set of user optical characteristics and saving in memory;
  F. storing in memory at the central station for each product of the specific product line its optical characteristics including largest image format, camera mounting, mag-macro, WD-macro, coax, external illumination, detents, motorization, resolve limit-macro, light gathering, internal focus, polarization, aperture diameter, cam to object length, parfocal zoom, N.A. micro, depth of field macro, and auto-focus;
  G. providing at the central station a data processor programmed with a set of instructions for automatically carrying out the conversion of step E to obtain the first set of user optical characteristics;
  H. if a product of the specific product line has been selected by the user; (1) comparing automatically via the programmed data processor the first set of user optical characteristics and the optical characteristics of the selected product to determine disparities and modifications of user's first inputs required to obtain a closer possibility for matching in terms of the user's specific imaging need, (2) sending interactively and automatically to the user and displaying to the user, disparities in optical characteristics and the choices available for modifying user first inputs to satisfy user's specific imaging need to move closer toward a match including an explanation of what the choices mean, (3) in response to step (2) modifying the user's first input according to selected choices to create user's second inputs and sending interactively by the user and receiving interactively at the central station the user's second inputs determined by modifying the user's first inputs according to selected choices, (4) converting interactively and automatically at the central station the user's second inputs into a second set of user optical characteristics and saving in memory, (5) comparing automatically via the programmed data processor the second set of user optical characteristics and the optical characteristics of the selected product to determine (α) if the central station can design an optical system that satisfies the user's specific imaging need, said optical system comprised of camera mount, lenses, accessories and spacers that perform within a predetermined tolerance range, (β) if so, then reporting to user, and (γ) if not, determining any remaining disparities and further modifications required to obtain a closer matching in terms of the user's specific imaging need, (6) sending interactively and automatically by the central station to the user and displaying to the user, the remaining disparities in optical characteristics in terms of the user's specific imaging need and choices available for modifying user current inputs including an explanation of what the choices mean, and (7) repeating steps (2) to (6) interactively and automatically until the central station can design an optical system that satisfies the user's specific imaging need, said optical system comprised of camera mount, lenses, accessories and spacers that performs within a predetermined tolerance range, and (h) reporting to user;

I. if a product of the specific product line has not been selected; (I) comparing automatically via the programmed data processor the first set of user optical characteristics and the optical characteristics of all specific product lines to determine any possibilities for matching in terms of the user's specific imaging need, (II) based on a possibility of matching, sending interactively and automatically to the user and displaying to the user, the disparities of the optical characteristics of any possible products in terms of the user's specific imaging need and the choices available for modifying user first in puts to move closer to a match including an explanation of what the choices mean, (III) in response to step (II), modifying the user's first inputs according to selected choices to create user's second inputs and sending interactively by the user and receiving interactively by the central station the user's second inputs, (IV) converting automatically at the central station the user's second inputs into a second set of user optical characteristics and saving in memory, (V) in response thereto, comparing automatically via the programmed data processor the second set of user optical characteristics and the optical characteristics of the possible matching product to determine if the central station can design an optical system that satisfies the user's specific imaging need, said optical system comprised of camera mount, lenses, accessories and spacers that performs within a predetermined tolerance range, if so, then reporting to user, and if not, determining any remaining disparities and further modifications required to obtain a closer matching, (VI) sending interactively and automatically to the user and displaying to the user any remaining disparities in the optical characteristics in terms of the user's specific imaging need and the choices available for modifying user's current inputs including an explanation of what the choices mean, and (VII) repeating steps (II) to (VI) interactively and automatically until the central station can design automatically via the computer application an optical system comprised of camera mount, lenses, accessories and spacers that satisfies the user's specific imaging need, said optical system comprised of camera mount, lenses, accessories and spacers that performs within a predetermined tolerance range; and (VIII) automatically reporting to user.

2. An interactive automated method for designing an optical system for imaging an object according to claim 1 wherein the basic inputs include at least one of vertical sensor size or line length, pixel size, and smallest dimension of object to be resolved.

3. An interactive automated method for designing an optical system for imaging an object according to claim 1 wherein a representative picture of the designed optical system with rough dimensions is shown to user with the report.

4. An interactive automated method for designing an optical system for imaging an object according to claim 1 wherein a price of the designed optical system is included in the report to the user.

* * * * *